United States Patent [19]

Janocha et al.

[11] Patent Number: 4,663,219

[45] Date of Patent: May 5, 1987

[54] MULTI-LAYER OPAQUE LOW DENSITY FILM

[75] Inventors: Siegfried Janocha, Wiesbaden; Guenther Crass, Taunusstein; Lothar Bothe, Mainz-Gonsenheim; Gunter Schloegl, Kelkheim, all of Fed. Rep. of Germany

[73] Assignee: Hoechst Aktiengesellschaft, Frankfurt am Main, Fed. Rep. of Germany

[21] Appl. No.: 780,442

[22] Filed: Sep. 26, 1985

[30] Foreign Application Priority Data

Oct. 9, 1984 [DE] Fed. Rep. of Germany ....... 3436961
Apr. 20, 1985 [DE] Fed. Rep. of Germany ....... 3514398

[51] Int. Cl.$^4$ ............................................... B65D 1/00
[52] U.S. Cl. .................... 428/213; 428/346; 428/336; 428/409
[58] Field of Search ............... 524/427, 584; 428/213, 428/346, 347, 349, 336, 409, 410; 360/133; 528/272; 521/118

[56] References Cited

U.S. PATENT DOCUMENTS

| | | | |
|---|---|---|---|
| 3,900,670 | 8/1975 | Ikeda et al. | 428/308 |
| 4,029,615 | 6/1977 | Kamens et al. | 260/2.5 R |
| 4,303,708 | 12/1981 | Gebhardt et al. | 428/35 |
| 4,377,616 | 3/1983 | Ashcraft et al. | 428/213 |
| 4,413,298 | 11/1983 | Pecsok et al. | 360/133 |
| 4,496,714 | 1/1985 | Murata et al. | 528/272 |
| 4,560,614 | 12/1985 | Park | 428/317.9 |

*Primary Examiner*—John E. Kittle
*Assistant Examiner*—Patrick J. Ryan
*Attorney, Agent, or Firm*—Schwartz, Jeffery, Schwaab, Mack, Blumenthal & Evans

[57] ABSTRACT

A coextruded multi-layer opaque film which has been biaxially oriented by stretching in the longitudinal direction and transverse direction at selected temperatures and with selected stretch ratios, and a method for producing the film. The film has a base layer of polypropylene or a copolymer thereof, and fillers. Its density is 0.4 to 0.6 g/cm$^3$, the amount of filler, based on the mixture of polypropylene and filler, is 16 to 30% by weight, and the particles of the filler employed have a mean size of 2 to 5 μm. Because of its reduced tendency to recover after folding, the film is particularly suitable for packaging purposes. One or more surface layers can be applied on either or both sides of the base layer.

13 Claims, No Drawings

MULTI-LAYER OPAQUE LOW DENSITY FILM

BACKGROUND OF THE INVENTION

The invention relates to a coextruded, biaxially oriented opaque film having a low density and composed of a base layer which essentially consists of polypropylene and fillers, and surface layers present on one or both sides. The invention further relates to a process for the manufacture of these films, and to their use.

A film of this nature is known from U.S. Pat. No. 4,303,708. According to the teaching of this patent, the film is supposed preferably to contain 5 to 15% by weight, and according to the example only 8% by weight, of filler particles. Also it is supposedly not critical, in the manufacture of the film, whether the longitudinal stretching and transverse stretching are carried out successively or simultaneously. The stretch ratios are also not considered important and are, according to the example, 5.5 (in the longitudinal direction) and 9.0 (in the transverse direction).

The film produced according to the example of the above patent has a relatively low density of 0.9 g/cm$^3$, attributable to a large number of cavities (vacuoles) which are formed on stretching the coextruded film.

In fact, during stretching, the polymer matrix is torn open at the grain boundaries of the organic or inorganic fillers which are incompatible with the polypropylene, leading to the formation of the said vacuoles in the film, i.e. to free, empty, unfilled spaces in the film. It is self-evident that these vacuoles or micro-cavities are distributed over the entire volume of the film. Due to the refraction (scattering) of light at these cavities, the film has an opaque surface with a gloss resembling mother of pearl.

Because of the opaque or mother of pearl appearance, these films have a promotionally extremely effective appearance. Since they are also readily printable, they are employed for diverse purposes, especially as a packaging film, among which, above all, chocolate bar packaging should be mentioned. Broader use of the known coextruded and biaxially stretched opaque polypropylene multi-layer film has not been made, however, due, in particular, to its relatively high cost and due to the fact also that it still requires improvement in various mechanical properties. These include its foldability, especially its pronounced tendency to revert, after bending, folding or creasing, to its starting position before folding.

This disadvantage is in principle exhibited by all stretch-oriented polypropylene films, even if they do not contain any filters. This property is particularly undesirable if the film is envisaged as a packaging film for wrapping relatively small articles of substantially round cross-section such as, for example, candles, bottles, candles, rolls of fruit drops or chocolate bars. In this process, the article is first completely wrapped in a rectangular piece of film and the closure is formed by twisting together the two projecting film ends. Biaxially oriented polypropylene films in this application show the disadvantage that their twisted film ends execute a reverse movement counter to the twisting direction, so that there is then the danger that the packaging will open.

A further prerequisite for twisting the film during packaging is the property of the film that it will not start to tear, or tear off completely, at the twist points but on the other hand is sufficiently rigid that during twisting it ill not shrink or crumple. This property, again, is insufficiently displayed by the known biaxially oriented polypropylene films, which is why, for example, regenerated cellulose film is predominantly employed for candy wrappings.

SUMMARY OF THE INVENTION

Starting from the state of the art which has been described, it is accordingly the object of the invention to provide a biaxially oriented polypropylene film which, when used as a packaging film, exhibits improved mechanical properties, especially a reduced tendency to revert to the starting position after having been bent, folded or twisted.

In particular, the film is intended to be suitable for the twist wrapping of small articles, such as candles, i.e. the film is to permit satisfactory twisting by virtue of its mechanical properties. On the other hand, however, the film should also be inexpensive to manufacture in that the film consumes little material but yet its strength remains adequate. In addition, however, the visual appearance of the film must appeal to the esthetic sense of the users.

These objects are achieved by a polymer film comprising (1) a base layer consisting essentially of 100 parts by weight of a polymer selected from the group consisting of polypropylene, a copolymer of propylene and at least one comonomer selected from ethylene and an alpha-olefin having from 4 to 8 carbon atoms, and a mixture of propylene homopolymer and one or more of the above copolymers, the amount of the comonomer being no greater than 10% by weight of the copolymer; and from about 16 to about 30 parts by weight of a filler, the filler having a mean particle size of from about 2 to about 5 μm; and (2) at least one surface layer covering the base layer, the surface layer selected from the group consisting of heat sealing, cold sealing and non-sealing polymers. The film is opaque, is biaxially oriented, and has a density of from about 0.4 to about 0.6 g/cm$^3$.

The objects of the invention are also achieved by a process of making a polymer film, consisting essentially of (1) coextruding a base layer and at least one surface layer through a die to form a film, the base layer and at least one surface layer having the compositions described above; (2) cooling the film to a solidification temperature; (3) stretching the film longitudinally at a temperature of from about 120° C. to about 130° C. and transversely at a temperature of from about 160° C. to about 170° C.; and (4) heat setting the biaxially stretched film.

DETAILED DESCRIPTION OF THE PREFERRED EMBODIMENTS

The opaque film according to the invention, which has been produced by ocoextrusion, is coated on one or both sides and successively stretched in the longitudinal direction at a temperature of from about 120° to about 130° C., and in the transverse direction at a temperature of from about 160° to about 170° C. The film has a low density and is built up from a base layer essentially consisting of polypropylene and fillers. It is essential to the invention that the amount of filler is relatively high, specifically between about 16 and about 30% by weight based on the mixture of polypropylene and filler. The filler has a mean particle size of from about 2 to about 5 μm. The film is stretched to a relatively high degree, namely successively from about 5.7-fold to about sevenfold in the longitudinal direction and from about eight-fold to about ten-fold in the transverse direction, and has a density which is extremely low, namely, equal to or less than about 0.6 g/cm³.

This solution to the problem is particularly surprising since it suggests, on the one hand, using a relatively high proportion of filler of relatively high density but, on the other hand, greatly reducing the overall density of the film, i.e. increasing the number of cavities without using any gas-forming substances for this purpose. This film can be folded better. It exhibits markedly reduced resilience, manifesting itself in a reduced tendency for folded parts of the film to recover, and can therefore in particular be employed for use as a wrapping film in the packaging sector.

The fact that the apparently very simple step of increasing the amount of filler should permit any lowering of the density of the finished film, especially since the increased amount of filler must increase the calculated density of the polypropylene/filler mixture from which the film is produced, was unforseeable. The extent of the reduction in density, namely the percentage difference between the density of the polypropylene-filler mixture and the density of the finished film is particularly high in the case of the film according to the invention, because the finished film exhibits a particularly low density. It was furthermore in fact to be expected that a polyproylene film with a relatively high filler content (at the expense of the polymer constituent) could only be produced, and in particular could only be biaxially stretched, with difficulty, if at all. Contrary to this expectation, the film according to the invention can, surprisingly, be easily produced and also biaxially stretched, with the values of the longitudinal stretch ratio being even higher than in the prior art process for the production of opaque polypropylene films of low density.

If the amount of filler is less than about 16% by weight, based on the mixture of polypropylene and filler, the desired low density is not achieved. If, on the other hand, the amount is greater than about 30% by weight, the film can no longer be stretched under the conditions mentioned. Analogous remarks also apply to the particle size of the pulverulent filler. In addition to the two aspects of amount of filler and filler particle size attention must be given, in the production of the film, to the longitudinal and transverse stretching ratios lying within the stated range, if the desired film is to be obtained.

A film preferred according to the invention is characterized in that the amount of filler is 16 to 27% by weight, based on the mixture of polypropylene and filler, and that the filler employed has a mean particle size of 3 to 4 μm.

The film according to the invention has a density of from about 0.4 to about 0.6, preferably about 0.4 to about 0.5, g/cm³. Its thickness is about 10 to about 80 μm, preferably about 20 to about 60 μm. The thickness of the coating contributes only little to the total thickness of the film and is advantageously about 0.1 to about 10 μm. In a preferred embodiment, the outer coating consists of sealable material.

The polypropylene of the base layer can be an isotactic homopolymer of propylene or a copolymer of propylene with ethylene or alpha-olefins having 4 to 8 carbon atoms or a mixture of propylene homopolymers and propylene copolymers. In the copolymers, the amount of comonomer is in general at most 10% by weight, based on the copolymer. Preferred comonomers are ethylene and butene-1. The polymer of the base layer advantageously has a melt flow index in the range from about 0.5 g/10 min to about 8 g/10 min at 230° C. and 2.16 kp load (DIN 53,735), especially from about 1.5 g/10 min to about 4 g/10 min.

The fillers are the customary inorganic or organic pulverulent materials incompatible with polypropylene. Inorganic fillers are preferred. Suitable inorganic fillers are aluminum oxide, aluminum sulfate, barium sulfate, calcium carbonate, magnesium carbonate, silicates such as aluminum silicate (kaolin clay) and magnesium silicate (talc), silicon dioxide and/or titanium dioxide, among which the use of calcium carbonate, silicon dioxide, titanium dioxide or mixtures thereof is preferred. Calcium carbonate (chalk) is particularly preferred. The amount of filler is, according to the invention, from about 16 to about 30% by weight, preferably from about 16 to about 27% by weight, based on the weight of the mixture of polypropylene and filler. The mean particle size of the pulverulent filler is, according to the invention, in the range from about 2 to about 5 μm, preferably in the range from about 3 to about 4 μm. The base layer can also contain advantageous additives such as antioxidants, antistatic agents, colorants and/or stabilizers, each in an effective amount.

The surface layers are as a rule heat-sealable or cold-sealable layers. They can also be non-sealable layers. All these layers may be present on one or both sides. The heat sealing layer preferably consists of an ethylene homopolymer (high density polyethylene or low density polyethylene), a copolymer of propylene as the main component and ethylene, preferably in an amount of at most 10% by weight (based on the copolymer), a copolymer of propylene as the main component and butene-1, preferably in an amount of from about 10 to about 15% by weight (based on the copolymer), a terpolymer of propylene, ethylene and an alpha-olefin having 4 to 10 carbon atoms, preferably a terpolymer of from about 93.2 to about 99.0% by weight of propylene, from about 0.5 to about 1.9% by weight of ethylene and from about 0.5 to about 4.9% by weight of an alpha-olefin having 4 to 10 carbon atoms, or a mixture of these polymers. The comonomers are essentially randomly distributed in the polymers (U.S. Pat. No. 4,303,708). Suitable cold sealing layers consist of polymers based on natural or synthetic rubber. The non-sealable surface layer preferably consists of an appropriate propylene homopolymer.

The thickness of the heat sealing layer is about 0.1 to about 10 μm, preferably from about 0.5 to about 2 μm. The cold sealing layer and the non-sealable layer as a rule are also of such thickness.

For use of the film for packaging of candies it has proved advantageous if one of the two outer heat-sealable layers forming the outside of the candy wrapping additionally contains a non-stick agent. By means of this additive, sticking, at elevated temperatures, of the candy-wrapping film to the outer wrapping, for example in the form of a film bag, can be avoided. Suitable non-stick agents include polysiloxanes present in amounts of from about 0.3% to about 3% by weight of said surface layer. A prefered non-stick agent is polydimethylsiloxane.

In the process for the manufacture of the film according to the invention, the melt of the polymer mixture which forms the base layer and essentially consists of polypropylene and fillers, with the amount of filler being 16 to 30, preferably 16 to 27% by weight based on the mixture of polypropylene and filler, and the filler employed having a particle size of 2 to 5 μm, preferably 3 to 4 μm, is coextruded together with the melt of the polymer forming the outer layers through a flat die or circular die, the film obtained by coextrusion is solidified by cooling and then stretched longitudinally at a temperature of 120° to 130° C. in a ratio of 5.7:1 to 7:1 and transversely at a temperature of 160° to 170° C. in a ratio of 8:1 to 10:1, and the biaxially stretched film is heat-set.

Biaxial stretching of the film can be effected by first stretching in the longitudinal direction and then in the transverse direction or first in the transverse direction and then in the longitudinal direction. What is essential is that the longitudinal stretching and transverse stretching should be carried out successively and at the stated temperatures and with the stated stretch ratios. The coextrusion of the mixture forming the base layer and the polymer forming the surface layer by means of a flat die, the cooling of the coextruded film to solidify it, the reheating of the film to the stretching temperature, the longitudinal and transverse stretching and the final heat-setting are carried out as described in U.S. Pat. No. 4,303,708, though the range of the longitudinal stretch ratio in the process of the invention is higher than the value of 5.5:1 specified in the patent. The cooling of the flat film to solidify it, and its reheating to the stretching temperature are advantageously effected with the aid of one or more rollers kept at the appropriate temperature. The longitudinal stretching of the film is usually effected with the aid of two pair of rollers which run at different speeds, corresponding to the desired stretch ratio, and the transverse stretching is effected with the aid of an appropriate tenter frame. It is advantageous to cool the film after the first stretching and to bring it back to the desired stretching temperature during its travel to the second stretching. The stretching of the film is followed by its heat-setting (heat treatment), which is carried out at a temperature of from about 150° to about 170° C. for a period of from about 0.5 to about 10 seconds.

The opaque film according to the invention, the density of which is in the range from 0.4 to 0.6 g/cm$^3$, is preferably employed for packaging purposes. Because of its increased yield and its reduced resilience, it is a particularly advantageous replacement for wrapping paper. It is, surprisingly, particularly suitable for twist wrapping of small articles, such as candles, and in spite of its low density does not start to tear during twisting but also does not tend to over-stretch or crumple. Due to its opacity and its gloss resembling mother of pearl the film has a promotionally effective appearance which can be further intensified by the use of colored fillers. Moreover, the film can, if required for special applications, readily be provided with a multicolor print.

The invention will now be explained in more detail still, with reference to examples.

EXAMPLE 1

A polypropylene film with heat-sealable surface layers present on both sides was coextruded at about 270° C. through a flat die. The mixture (melt) of the film forming the base layer consisted of 80 parts by weight of a propylene homopolymer and 20 parts by weight of pulverulent calcium carbonate having a mean particle size of 3.8 μm. The melt of the polymer forming the surface layers consisted of a random copolymer of propylene with 4% by weight of ethylene. After the coextruded film had been cooled to about 30° C. by means of a cooling roll, it was stretched longitudinally at 125° C. in a stretch ratio of 6.0 and thereafter transversely at 165° C. with a stretch ratio of 9.0. The subsequent heat-setting was carried out for 5 seconds at 160° C.

The opaque multi-layer film thus obtained had a density of 0.46 g/cm$^3$ and a thickness of 35 μm; each of the heat sealing layers was 1 μm thick.

EXAMPLE 2

A polypropylene film with heat-sealable surface layers present on both sides was coextruded through a flat die at about 270° C. The melt forming the base layer consisted of 75 parts by weight of a propylene homopolymer and 25 parts by weight of pulverulent calcium carbonate having a mean particle size of 3.2 μm. The melt of the polymer forming the surface layers consisted of the copolymer mentioned in Example 1. The procedure followed was as in Example 1 except that the longitudinal stretching was carried out with a stretch ratio of 6.8 and the transverse stretching with a stretch ratio of 8.5.

The opaque multi-layer film thus obtained had a density of 0.42 g/cm$^3$ and a thickness of 50 μm; each of the heat sealing layers was 1 μm thick.

The films produced in accordance with the examples exhibit very little tendency to unfold, and reassume their flat form, after having been folded and used to wrap cuboid articles.

To test their properties for wrapping of candies, 5000 candies were individually packed in twist wraps by means of a candy wrapping machine as described in "Verpacken mit Kunststoffen" ("Packaging with Plastics"), page 231/232 (Guenther Kuehne, Carl-Hanser Verlag Munich 1974). No tear-starting or tearing-off of the film was observed and the twisted film portions showed good rigidity so that the packaging did not open of its own accord by automatically untwisting counter to the direction in which it had been twisted. On the other hand, the packaging could be opened easily in order to remove the packaged contents.

What is claimed is:

1. A wrapped article, comprising:
   (a) an article to be wrapped; and
   (b) a wrapper positioned over said article and having at least one end extending from said article, said end being twisted, said wrapper comprising:
      (1) a base layer containing from about 16 to about 25% by weight of a filler having a mean particle size of from about 2 to about 5 μm, the remainder of said base layer comprising a polymer selected from the group consisting of polypropylene, a copolymer of propylene and at least one comonomer selected from ethylene and an alpha-olefin having from 4 to 8 carbon atoms, and a mixture of propylene homopolymer and one or more of the above copolymers, the amount of said comonomer being no greater than about 10% by weight of said copolymer; and
      (2) a least one surface layer covering said base layer, said surface layer selected from the group consisting of heat sealing, cold sealing and non-sealing polymers;
   wherein said wrapper is opaque and is biaxially oriented, and has a density of from about 0.4 to about 0.6 g/cm$^3$.

2. A wrapped article as claimed in claim 1, wherein said wrapper has a density of from about 0.4 to about 0.5 g/cm³.

3. A wrapped article as claimed in claim 1, wherein the amount of filler in said base layer is from 16 to 27% by weight.

4. A wrapper article as claimed in claim 1, wherein the filler employed has a said particle size of from about 3 to about 4 μm.

5. A wrapped article as claimed in claim 1, wherein the filler consists of calcium carbonate.

6. A wrapped article as claimed in claim 1, wherein the thickness of the surface layer is from about 0.1 to about 10 μm and the total thickness of said wrapper is from about 10 to about 80 μm.

7. A wrapped article as claimed in claim 1, wherein said surface layer is a heat sealing layer selected from the group consisting of ethylene homopolymer, a copolymer of propylene and ethylene wherein the amount of ethylene is no more than 10% by weight of the copolymers, a copolymer of propylene and butene-1 wherein the amount of butene-1 is from about 10% to about 15% by weight of the copolymer, a terpolymer of propylene, ethylene and an alpha-olefin having from 4 to 10 carbon atoms, said terpolymer having from about 93.2% to about 99.0% by weight propylene, from about 0.5% to 1.9% by weight ethylene, and from about 0.5% to about 4.9% by weight of said alpha-olefin, and a mixture of the above polymers.

8. A wrapped article as claimed in claim 7, wherein said heat sealing layer contains a non-stick agent present in an amount of from about 0.3 to about 3% by weight of said surface layer.

9. A wrapped article as claimed in claim 8, wherein said non-stick agent is polydimethylsiloxane.

10. A wrapped article as claimed in claim 1, wherein said at least one surface layer is a cold sealing layer selected from the group consisting of natural and synthetic rubbers.

11. A wrapped article as claimed in claim 1, wherein said at least one surface layer is a non-sealable surface layer consisting of a propylene homopolymer.

12. A wrapped article as claimed in claim 1, wherein said base layer is covered on each side with at least one separate surface layer.

13. A wrapped article as claimed in claim 1, wherein said film is coextruded and biaxially oriented.

* * * * *